(12) United States Patent
Hsiao et al.

(10) Patent No.: US 9,280,009 B2
(45) Date of Patent: Mar. 8, 2016

(54) DOUBLE-SIDED CURVED LIQUID CRYSTAL DISPLAY DEVICE

(71) Applicant: Shenzhen China Star Optoelectronics Technology Co., Ltd., Shenzhen, Guangdong (CN)

(72) Inventors: Yuchun Hsiao, Guangdong (CN); Yanxue Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 118 days.

(21) Appl. No.: 14/374,505

(22) PCT Filed: May 8, 2014

(86) PCT No.: PCT/CN2014/077044
§ 371 (c)(1),
(2) Date: Jul. 24, 2014

(87) PCT Pub. No.: WO2015/161532
PCT Pub. Date: Oct. 29, 2015

(65) Prior Publication Data
US 2015/0323826 A1 Nov. 12, 2015

(30) Foreign Application Priority Data
Apr. 25, 2014 (CN) .......................... 2014 1 0173066

(51) Int. Cl.
*G02F 1/1333* (2006.01)
*G02F 1/1347* (2006.01)
*G02F 1/1335* (2006.01)

(52) U.S. Cl.
CPC .... *G02F 1/133308* (2013.01); *G02F 1/133504* (2013.01); *G02F 1/133553* (2013.01); *G02F 1/133615* (2013.01); *G02F 2001/133342* (2013.01)

(58) Field of Classification Search
CPC .............. G02F 2001/133342; G02F 1/133308; G02F 1/133504; G02F 1/133615; G02F 1/133553
USPC ...................................... 349/58, 74
See application file for complete search history.

(56) References Cited

U.S. PATENT DOCUMENTS

| 9,087,463 B2 * | 7/2015 | Hsu .................. G02F 1/133603 |
| 2007/0188681 A1 * | 8/2007 | Cho .................. G02F 1/133555 349/114 |

* cited by examiner

*Primary Examiner* — Nathanael R Briggs
(74) *Attorney, Agent, or Firm* — Andrew C. Cheng (57) ABSTRACT

The present invention provides a double-sided curved liquid crystal display device, which includes: a backlight frame (1), first and second LED light sources (3, 5) that are mounted in the backlight frame (1) and are opposite to each other, first and second diffuser plates (7, 9) that are mounted in the backlight frame (1) and are opposite to each other, first and second mold frames (2, 4) that are mounted on the backlight frame (1) and are opposite to each other, first and second curved liquid crystal display panels (6, 8) that are respectively mounted to the first and second mold frames (2, 4) and are opposite to each other, and a bezel (10) that is mounted to the first and second curved liquid crystal display panels (6, 8). The first and second LED light sources (3, 5) face opposite directions. The backlight frame (1) includes a backplane brace (15), a backplane (11), and a backplane mounting strip (13). The first and second diffuser plates (7, 9) are planar.

15 Claims, 5 Drawing Sheets

DOUBLE-SIDED CURVED LIQUID CRYSTAL DISPLAY DEVICE

BACKGROUND OF THE INVENTION

1. Field of the Invention

The present invention relates to the field of liquid crystal displaying, and in particular to a double-sided curved liquid crystal display device.

2. The Related Arts

Liquid crystal displays (LCDs) have a variety of advantages, such as thin device body, low power consumption, and being free of radiation, and are thus of wide applications. Most of the liquid crystal displays that are currently available in the market are backlighting liquid crystal displays, which comprise a liquid crystal panel and a backlight module. The principle of operation of a liquid crystal panel is that with liquid crystal molecules interposed between two parallel glass substrates and a number of vertical and horizontal tiny electrical wires arranged between the two glass substrates, application of electricity is made to control the liquid crystal molecules to change orientation in order to refract out the light emitting from the backlight module for generation of images. Since the liquid crystal panel itself does not emit light, light must be provided from the backlight module in order to normally display images. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel so that the light is homogenized by passing through a diffusion plate to form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, with the progress of the liquid crystal displaying technology, major manufacturers have marketed curved liquid crystal display devices one after another. Generally speaking, the curved liquid crystal display devices allow for the best viewing effect from edge to edge, enabling an increase of viewing distance of the user to achieve better experience of viewing. Most of the curved liquid crystal displays that are currently available are single-sided curved liquid crystal displays. In the field of commercial display devices, the application of double-sided display devices is getting wider and wider. Most of the double-sided display devices that are currently available are double-sided flat display devices, which are of not strong attraction to the market. Compared to the double-sided flat display devices, double-sided curved liquid crystal display devices have remarkable advantages, such as strengthening attraction to the market and the consumers and achieving brand discrepancy.

Figure 1:
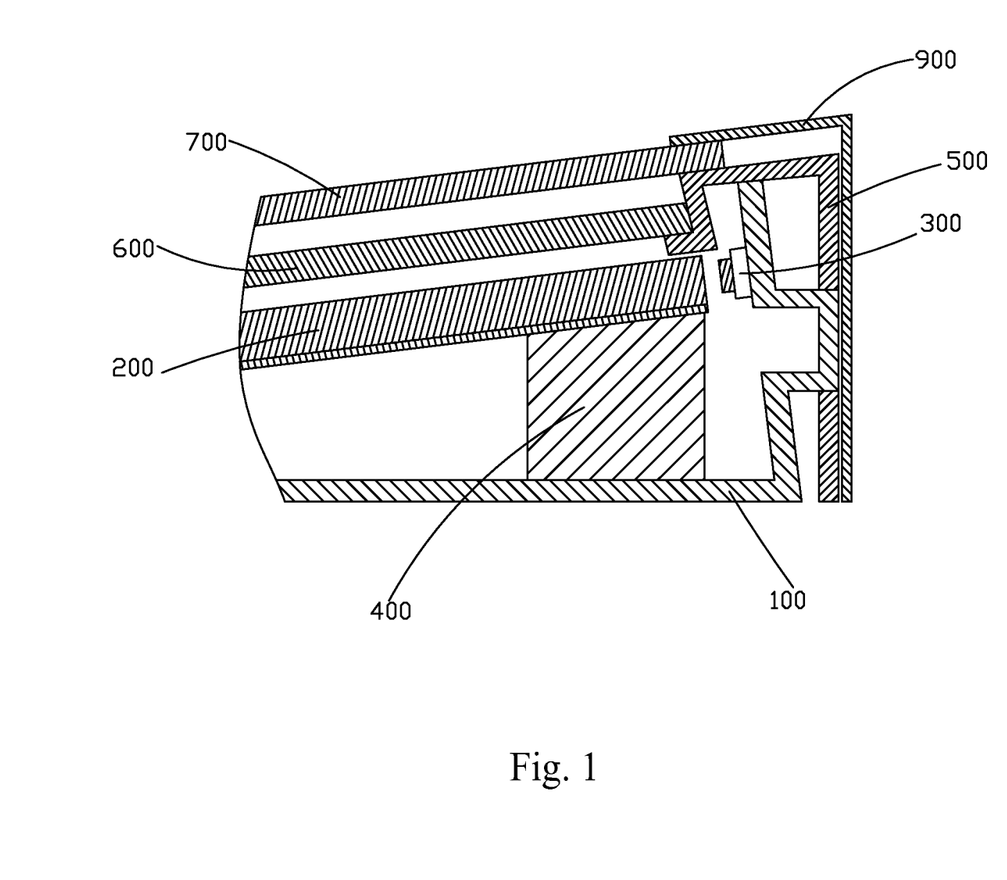
FIG. 1 is a schematic view showing the structure of a conventional side-edge single-sided curved liquid crystal display device.

Referring to FIG. 1, a conventional single-sided curved liquid crystal display device comprises a backplane 100, a light guide plate 200 mounted in the backplane 100, an LED backlight source 300, a cushion block 400 supporting the light guide plate 200, a mold frame 500 mounted on the backplane 100, an optical film assembly 600 mounted in the mold frame 100, a liquid crystal display panel 700 mounted on the mold frame 500, and a front bezel 900 mounted on the liquid crystal display panel 700. Since liquid crystal display plane 700 is curved, to accommodate the arrangement thereof, a side plate of the backplane 100 is made inclined with respect to a bottom plate for mounting the LED backlight source 300. Other components, such as the light guide plate 200, the cushion block 400, the mold frame 500, the optical film assembly 600, and the front bezel 700, are all arranged to show a curved structure. Namely, an arrangement of curved backlighting is used. The overall design and manufacture of the product are difficult and the cost is raised.

The above-mentioned problems must be handled for the double-sided curved liquid crystal display devices in order to make the structure of the double-sided curved display device simple and the manufacturing cost low.

SUMMARY OF THE INVENTION

An object of the present invention is to provide a double-sided curved liquid crystal display device, which has a simple structure and allows for easing of the design and manufacture thereof and reduction of the manufacturing cost so as to strengthen product attraction to the market.

To achieve the above object, the present invention provides a double-sided curved liquid crystal display device, which comprises: a backlight frame, first and second LED (Light-Emitting Diode) light sources that are mounted in the backlight frame and are opposite to each other, first and second diffuser plates that are mounted in the backlight frame and are opposite to each other, first and second mold frames that are mounted on the backlight frame and are opposite to each other, first and second curved liquid crystal display panels that are respectively mounted to the first and second mold frames and are opposite to each other, and a bezel that is mounted to the first and second curved liquid crystal display panels. The first LED light source faces one side of the backlight frame and the second LED light source faces an opposite side of the backlight frame. The backlight frame comprises a backplane brace, a backplane mounted to the backplane brace, and a backplane mounting strip mounted to the side of the backplane that is away from the backplane brace. The first and second diffuser plates are planar. The first and second curved liquid crystal display panels are curved in the same direction or in different directions.

The backplane and the backplane mounting strip are respectively provided with a plurality of first and second through holes that correspond to each other and the backplane brace is provided with a plurality of the threaded holes corresponding to the plurality of first and second through holes. A bolt is set through the first and second through holes to engage each of the threaded holes so as to couple the backplane brace, the backplane, and the backplane mounting strip to each other.

The backplane mounting strip comprises a first mounting groove formed in a middle portion thereof and the first LED light source is received and retained in the first mounting groove; and the backplane brace comprises a second mounting groove formed in a middle portion thereof and the second LED light 5 is received and retained in the second mounting groove.

The first LED light source is retained in the first mounting groove through interference fitting and the second LED light source is retained in the second mounting groove through interference fitting.

The bezel comprises a side plate and first and second surface plates respectively connected to opposite ends of the side plate. The first and second mold frames are mounted to the backplane brace and are adjacent to the side plate. The first mold frame comprises a first curved surface and the first curved surface is curved so as to be of a curving direction and curvature that are the same as those of the first curved liquid crystal display panel, whereby the first curved liquid crystal display panel is positioned against the first curved surface. The second mold frame comprises a second curved surface and the second curved surface is curved so as to be of a curving direction and curvature that are the same as those of the second curved liquid crystal display panel, whereby the second curved liquid crystal display panel is positioned against the second curved surface. The first surface plate of the bezel comprises a third curved surface and the third curved surface is curved so as to be of a curving direction and curvature that are the same as those of the first curved liquid crystal display panel, whereby the third curved surface is positioned tightly against the first curved liquid crystal display panel. The second surface plate comprises a fourth curved surface and the fourth curved surface is curved so as to be of a curving direction and curvature that are the same as those of the second curved liquid crystal display panel, whereby the fourth curved surface is positioned tightly against the second curved liquid crystal display panel.

The double-sided curved liquid crystal display device further comprises a first cushion member arranged between the first curved surface and the first liquid crystal display panel and is coupled through adhesive bonding to the first curved surface and a second cushion member arranged between the second curved surface and the second liquid crystal display panel and coupled through adhesive bonding to the second curved surface.

The double-sided curved liquid crystal display device further comprises a third cushion member arranged between the third curved surface and the first liquid crystal display panel and coupled through adhesive bonding to the third curved surface and a fourth cushion member arranged between the fourth curved surface and the second liquid crystal display panel and coupled through adhesive bonding to the fourth curved surface.

The backplane brace has an end that is provided with first and second projection blocks at sides thereof respectively adjacent to the first and second mold frames. The first and second mold frames are respectively provided with first and second recesses corresponding to the first and second projection blocks. The first and second projection blocks are respectively fit into and retained in the first and second recesses so as to couple the backplane brace to the first and second mold frames.

The backplane brace comprises first and second support surfaces that are arranged to be opposite to each other. The first and second support surfaces are both flat planar surfaces and both protrude with respect to the middle portion of the backplane brace. The first and second diffuser plates are respectively supported on the first and second support surfaces. A first bearing member is arranged between the first mold frame and the first diffuser plate and is coupled through adhesive bonding to the first mold frame and tightly presses down and holds the first diffuser plate. A second bearing member is arranged between the second mold frame and the second diffuser plate and is coupled through adhesive bonding to the second mold frame and tightly presses down and holds the second diffuser plate.

The double-sided curved liquid crystal display device further comprises first and second reflector plates that are mounted to the backlight frame to respectively correspond to the first and second diffuser plates.

The present invention also provides a double-sided curved liquid crystal display device, which comprises: a backlight frame, first and second LED (Light-Emitting Diode) light sources that are mounted in the backlight frame and are opposite to each other, first and second diffuser plates that are mounted in the backlight frame and are opposite to each other, first and second mold frames that are mounted on the backlight frame and are opposite to each other, first and second curved liquid crystal display panels that are respectively mounted to the first and second mold frames and are opposite to each other, and a bezel that is mounted to the first and second curved liquid crystal display panels, the first LED light source facing one side of the backlight frame, the second LED light source facing an opposite side of the backlight frame, the backlight frame comprising a backplane brace, a backplane mounted to the backplane brace, and a backplane mounting strip mounted to the side of the backplane that is away from the backplane brace, the first and second diffuser plates being planar, the first and second curved liquid crystal display panels being curved in the same direction or in different directions;

wherein the backplane and the backplane mounting strip are respectively provided with a plurality of first and second through holes that correspond to each other and the backplane brace is provided with a plurality of the threaded holes corresponding to the plurality of first and second through holes, a bolt being set through the first and second through holes to engage each of the threaded holes so as to couple the backplane brace, the backplane, and the backplane mounting strip to each other;

wherein the backplane mounting strip comprises a first mounting groove formed in a middle portion thereof and the first LED light source is received and retained in the first mounting groove; and the backplane brace comprises a second mounting groove formed in a middle portion thereof and the second LED light is received and retained in the second mounting groove;

wherein the first LED light source is retained in the first mounting groove through interference fitting and the second LED light source is retained in the second mounting groove through interference fitting;

wherein the bezel comprises a side plate and first and second surface plates respectively connected to opposite ends of the side plate, the first and second mold frames being mounted to the backplane brace and adjacent to the side plate, the first mold frame comprising a first curved surface, the first curved surface being curved so as to be of a curving direction and curvature that are the same as those of the first curved liquid crystal display panel, whereby the first curved liquid crystal display panel is positioned against the first curved surface; the second mold frame comprises a second curved surface, the second curved surface being curved so as to be of a curving direction and curvature that are the same as those of the second curved liquid crystal display panel, whereby the second curved liquid crystal display panel is positioned against the second curved surface; the first surface plate of the bezel comprises a third curved surface, the third curved surface being curved so as to be of a curving direction and curvature that are the same as those of the first curved liquid crystal display panel, whereby the third curved surface is positioned tightly against the first curved liquid crystal display panel; the second surface plate comprises a fourth curved surface, the fourth curved surface being curved so as to be of a curving direction and curvature that are the same as those of the second curved liquid crystal display panel, whereby the fourth curved surface is positioned tightly against the second curved liquid crystal display panel; and further comprising a first cushion member arranged between the first curved surface and the first liquid crystal display panel and coupled through adhesive bonding to the first curved surface; and a second cushion member is arranged between the second curved surface and the second liquid crystal display panel and is coupled through adhesive bonding to the second curved surface.

The double-sided curved liquid crystal display device further comprises a third cushion member arranged between the third curved surface and the first liquid crystal display panel and coupled through adhesive bonding to the third curved surface and a fourth cushion member arranged between the fourth curved surface and the second liquid crystal display panel and coupled through adhesive bonding to the fourth curved surface.

The backplane brace has an end that is provided with first and second projection blocks at sides thereof respectively adjacent to the first and second mold frames. The first and second mold frames are respectively provided with first and second recesses corresponding to the first and second projection blocks. The first and second projection blocks are respectively fit into and retained in the first and second recesses so as to couple the backplane brace to the first and second mold frames.

The backplane brace comprises first and second support surfaces that are arranged to be opposite to each other. The first and second support surfaces are both flat planar surfaces and both protrude with respect to the middle portion of the backplane brace. The first and second diffuser plates are respectively supported on the first and second support surfaces. A first bearing member is arranged between the first mold frame and the first diffuser plate and is coupled through adhesive bonding to the first mold frame and tightly presses down and holds the first diffuser plate. A second bearing member is arranged between the second mold frame and the second diffuser plate and is coupled through adhesive bonding to the second mold frame and tightly presses down and holds the second diffuser plate.

The double-sided curved liquid crystal display device further comprises first and second reflector plates that are mounted to the backlight frame to respectively correspond to the first and second diffuser plates.

The efficacy of the present invention is that the present invention provides a double-sided curved liquid crystal display device, which comprises a backlight frame that comprises a structure made up of a backplane brace, a backplane, and a backplane mounting strip assembled together and two LED backlight sources, which are set in opposite directions and are both mounted to the same backlight frame, wherein curves are only provided on the mold frames and the bezel to accommodate the curved liquid crystal displays, whereby the double-sided curved liquid crystal display device is made with a simple structure and allows for lowering of the difficult of design and manufacture and helps improve product attraction to the market.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 2:
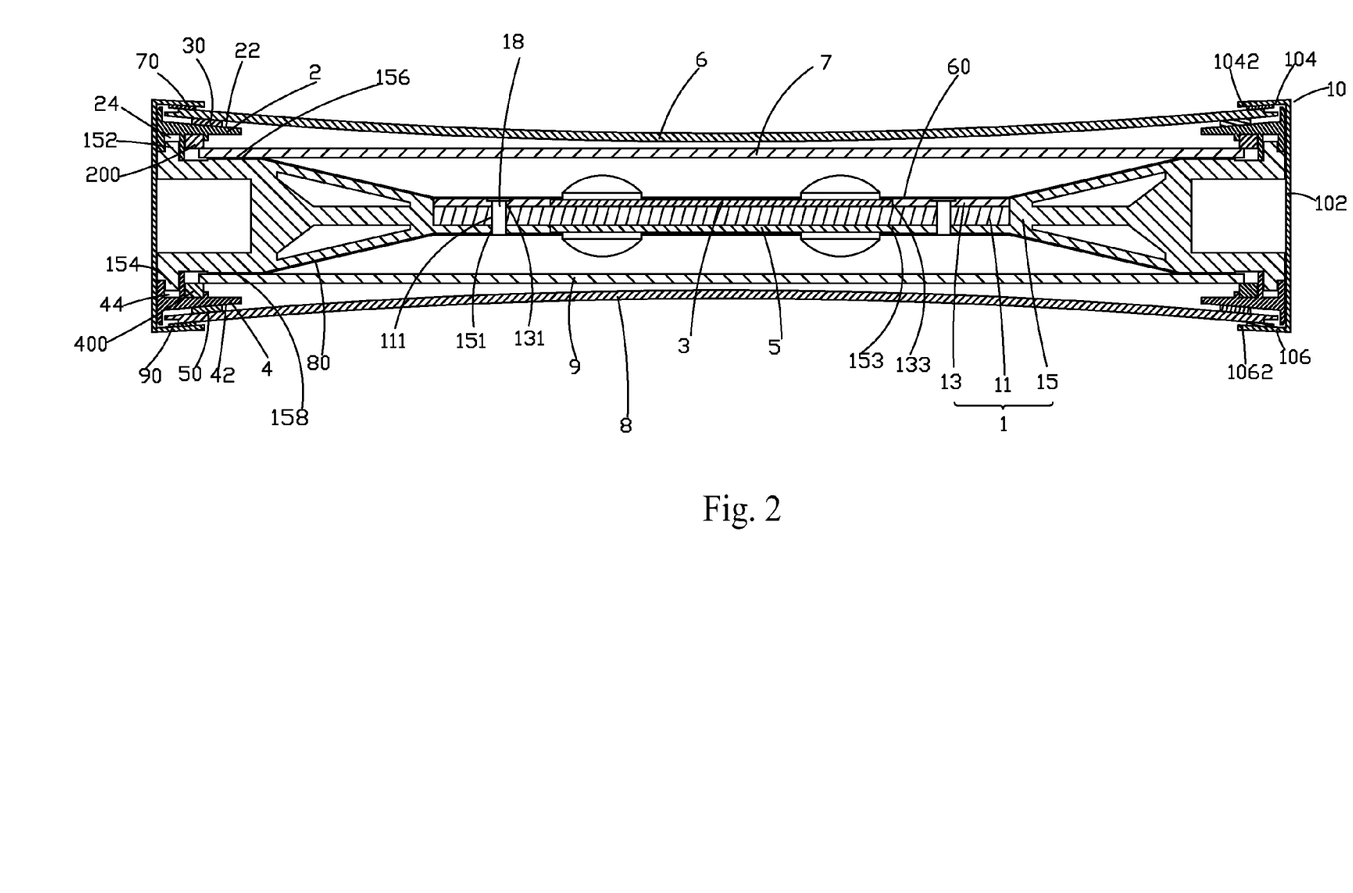
FIG. 2 is a schematic view showing the structure of a double-sided curved liquid crystal display device according to an embodiment of the present invention.
Figure 3:
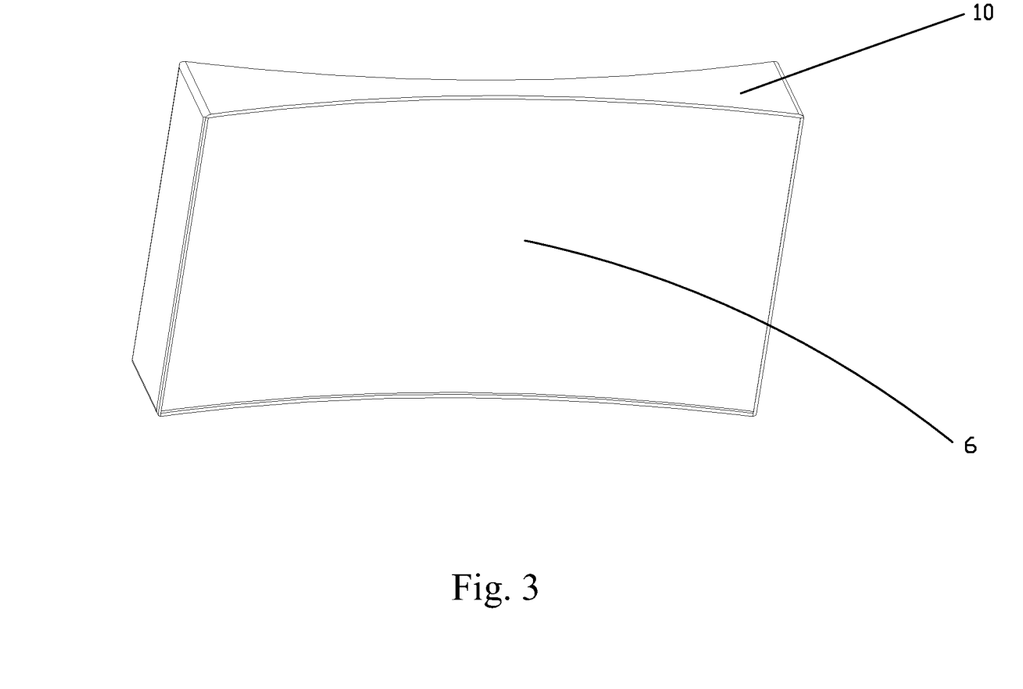
FIG. 3 is a perspective view showing the double-sided curved liquid crystal display device according to the embodiment of the present invention.

Referring to FIGS. 2 and 3, which show a double-sided curved liquid crystal display device according to a preferred embodiment of the present invention, the double-sided curved liquid crystal display device comprises: a backlight frame 1, first and second LED light sources 3, 5 that are mounted in the backlight frame 1 and are opposite to each other, first and second diffuser plates 7, 9 that are mounted in the backlight frame 1 and are opposite to each other, first and second mold frames 2, 4 that are mounted on the backlight frame 1 and are opposite to each other, first and second curved liquid crystal display panels 6, 8 that are respectively mounted to the first and second mold frames 2, 4 and are opposite to each other, and a bezel 10 that is mounted to the first and second curved liquid crystal display panels 6, 8.

The first LED light source 3 faces one side of the backlight frame 1 and the second LED light source 5 faces the opposite side of the backlight frame 1 in a direction opposite to that of the first LED light source 3. The first and second LED light sources 3, 5 supply lights to the first and second curved liquid crystal display panels 6, 8 respectively.

The first and second diffuser plates 7, 9 are flat planar.

The first and second curved liquid crystal display panels 6, 8 are curved either in the same direction or in different directions. In other words, the first and second curved liquid crystal display panels 6, 8 can be curved in directions that respectively show concavity and convexity, or that both show convexity or both show concavity, with respect to the first and second LED light sources 3, 5. In the instant embodiment, the first and second curved liquid crystal display panels 6, 8 are curved in opposite directions and are respectively concave with respect to the first and second LED light sources 3, 5.

The backlight frame 1 comprises a backplane brace 15, a backplane 11 mounted to the backplane brace 15, and a backplane mounting strip 13 mounted to the side of the backplane 11 that is away from the backplane brace 15.

Specifically, the backplane 11 and the backplane mounting strip 13 are respectively provided with a plurality of first and second through holes 111, 131 that correspond to each other and the backplane brace 15 is provided with a plurality of threaded holes 151 corresponding to the plurality of first and second through holes 111, 131. A bolt 18 is set through the first and second through holes 111, 131 to engage each of the threaded holes 151 so as to couple the backplane brace 15, the backplane 11, and the backplane mounting strip 13 to each other.

The first and second LED light sources 3, 5 are respectively mounted to the backplane mounting strip 13 and the backplane brace 15. Specifically, the backplane mounting strip 13 comprises a first mounting groove 133 formed in a middle portion thereof and the first LED light source 3 is received and retained in the first mounting groove 133. The backplane brace 15 comprises a second mounting groove 153 formed in a middle portion thereof and the second LED light source 5 is received and retained in the second mounting groove 153. Further, the first LED light source 3 is retained in the first mounting groove 133 through interference fitting and the second LED light source 5 is retained in the second mounting groove 153 through interference fitting.

The backplane brace 15 comprises first and second support surfaces 156, 158 that are arranged to be opposite to each other. The first and second support surfaces 156, 158 are both flat planar surfaces and are both protruding with respect to the middle portion of the backplane brace 15. The first and second diffuser plates 7, 9 are respectively supported on the first and second support surfaces 156, 158.

The bezel 10 comprises a side plate 102 and first and second surface plates 104, 106 respectively connected to opposite ends of the side plate 102. The first and second mold frames 2, 4 are mounted to the backplane brace 15 and are respectively adjacent to the side plate 102. The first mold frame 2 comprises a first curved surface 22 and the first curved surface 22 is curved so as to be of a curving direction and curvature that are the same as those of the first curved liquid crystal display panel 6, whereby the first curved liquid crystal display panel 6 is positioned against the first curved surface 22. The second mold frame 4 comprises a second curved surface 42 and the second curved surface 42 is curved so as to be of a curving direction and curvature that are the same as those of the second curved liquid crystal display panel 8, whereby the second curved liquid crystal display panel 8 is positioned against the second curved surface 42. The first surface plate 104 of the bezel 10 comprises a third curved surface 1042 and the third curved surface 1042 is curved so as to be of a curving direction and curvature that are the same as those of the first curved liquid crystal display panel 6, whereby the third curved surface 1042 is positioned tightly against the first curved liquid crystal display panel 6. The second surface plate 106 comprises a fourth curved surface 1062 and the fourth curved surface 1062 is curved so as to be of a curving direction and curvature that are the same as those of the second curved liquid crystal display panel 8, whereby the fourth curved surface 1062 is positioned tightly against the second curved liquid crystal display panel 8.

Arranged between the first curved surface 22 and the first liquid crystal display panel 6 is a first cushion member 30, which is coupled through adhesive bonding to the first curved surface 22. Arranged between the second curved surface 42 and the second liquid crystal display panel 8 is a second cushion member 50, which is coupled through adhesive bonding to the second curved surface 42. The first and second cushion members 30, 50 provide an effect of cushioning vibration and protecting the liquid crystal display panels.

Arranged between the third curved surface 1042 and the first liquid crystal display panel 6 is a third cushion member 70, which is coupled through adhesive bonding to the third curved surface 1042. Arranged between the fourth curved surface 1062 and the second liquid crystal display panel 8 is a fourth cushion member 90, which is coupled through adhesive bonding to the fourth curved surface 1062. The third and fourth cushion members 70, 90 provide an effect of cushioning vibration and securely holding and protecting the liquid crystal display panels.

The backplane brace 15 has an end that is provided with first and second projection blocks 152, 154 at sides thereof respectively adjacent to the first and second mold frames 2, 4. The first and second mold frames 2, 4 are respectively provided with first and second recesses 24, 44 corresponding to the first and second projection blocks 152, 154. The first and second projection blocks 152, 154 are respectively fit into and retained in the first and second recesses 24, 44 so as to couple the backplane brace 15 to the first and second mold frames 2, 4.

Arranged between the first mold frame 2 and the first diffuser plate 7 is a first bearing member 200, which is coupled through adhesive bonding to the first mold frame 2 and tightly presses down and holds the first diffuser plate 7. Arranged between the second mold frame 4 and the second diffuser plate 9 is a second bearing member 400, which is coupled through adhesive bonding to the second mold frame 4 and tightly presses down and holds the second diffuser plate 9.

The double-sided curved liquid crystal display device further comprises first and second reflector plates 60, 80 that are mounted to the backlight frame 1 to respectively correspond to the first and second diffuser plates 7, 9.

Lights emitting from the first and second LED light sources 3, 5 are respectively reflected by the first and second reflector plates 60, 80 to enter the first and second diffuser plates 7, 9 and are then homogenized by the first and second diffuser plates 7, 9 to form planar light sources that are respectively supplied to the first and second curved liquid crystal display panels 6, 8.

Figure 4:
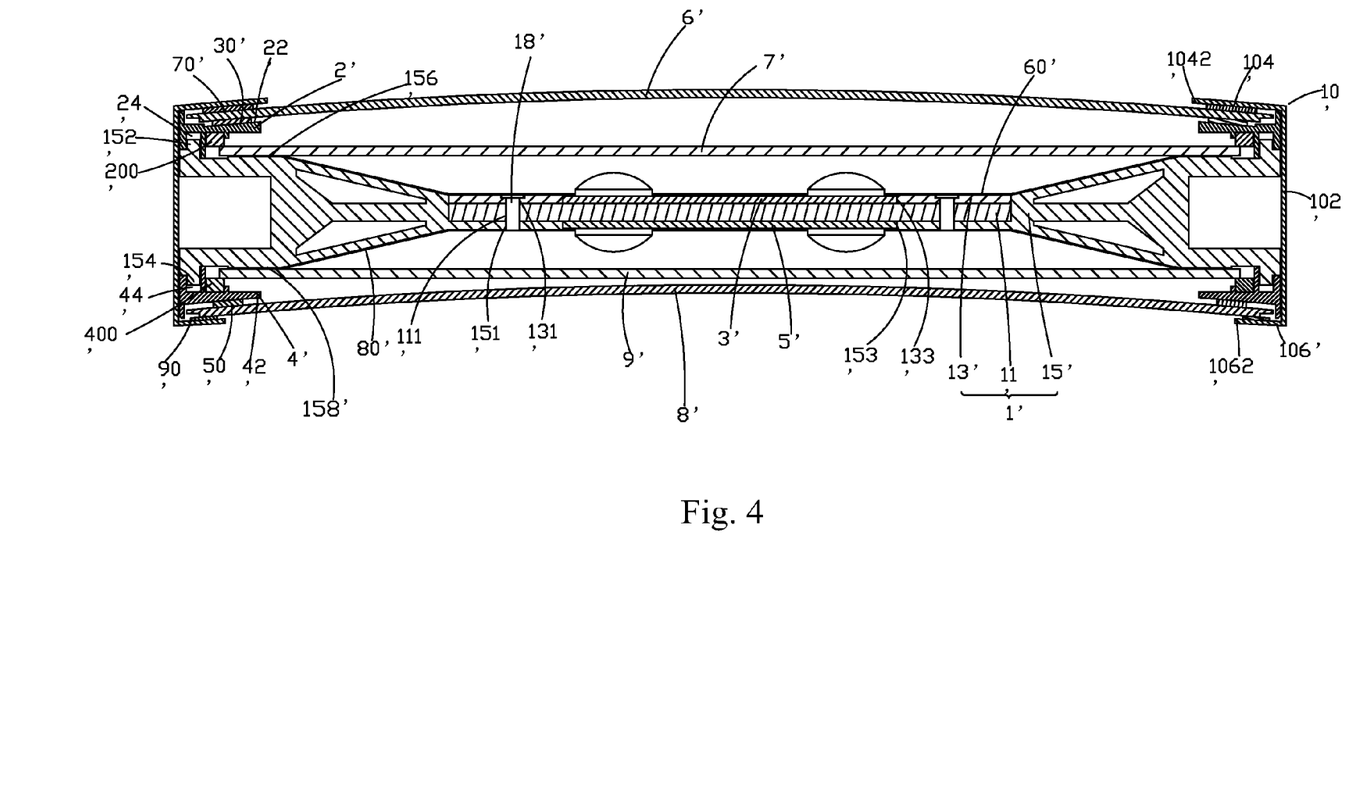
FIG. 4 is a schematic view showing the structure of a double-sided curved liquid crystal display device according to another embodiment of the present invention.
Figure 5:
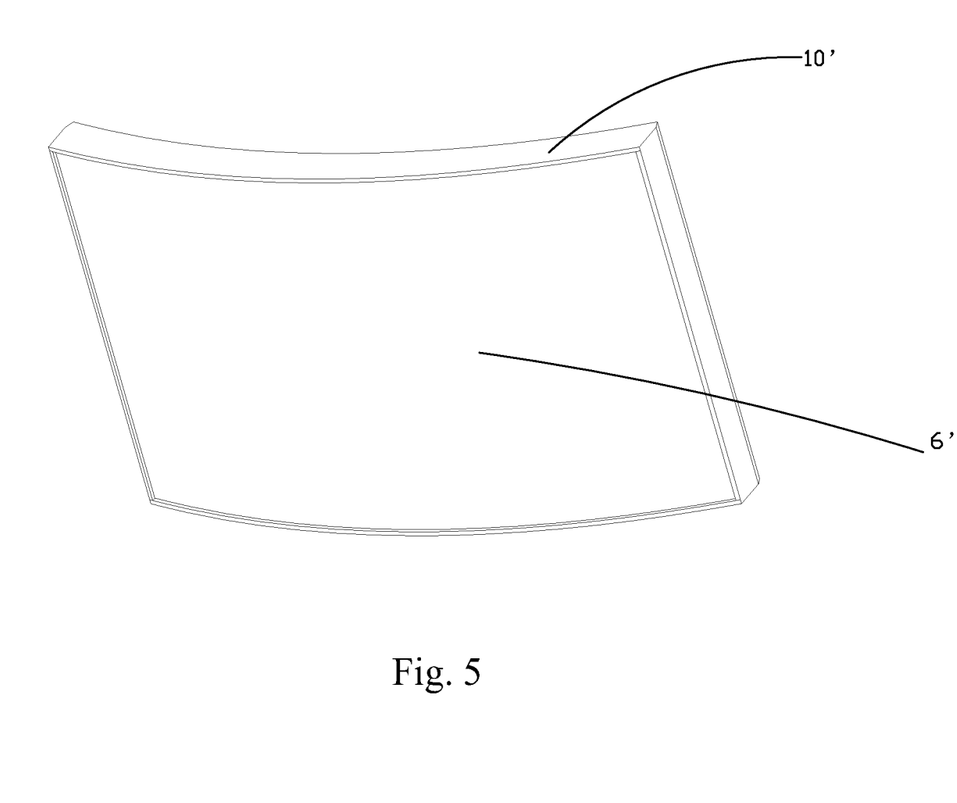
FIG. 5 is a perspective view showing the double-sided curved liquid crystal display device according to said another embodiment of the present invention.

Referring to FIGS. 4 and 5, a double-sided curved liquid crystal display device according to another preferred embodiment of the present invention is shown and is different from the previous embodiment is that the first and second liquid crystal display panels 6', 8' are curved in the same direction. In other words, the first liquid crystal display panel 6' is convex with respect to the first LED light source 3', while the second liquid crystal display unit 8' is concave with respect to the second LED light source 5'. This also achieves the same function of curved double-sided displaying.

In summary, the present invention provides a double-sided curved liquid crystal display device, which comprises a backlight frame that comprises a structure made up of a backplane brace, a backplane, and a backplane mounting strip assembled together and two LED backlight sources, which are set in opposite directions and are both mounted to the same backlight frame, wherein curves are only provided on the mold frames and the bezel to accommodate the curved liquid crystal displays, whereby the double-sided curved liquid crystal display device is made with a simple structure and allows for lowering of the difficult of design and manufacture and helps improve product attraction to the market.

Based on the description given above, those having ordinary skills of the art may easily contemplate various changes and modifications of the technical solution and technical ideas of the present invention and all these changes and modifications are considered within the protection scope of right for the present invention.

What is claimed is:
1. A double-sided curved liquid crystal display device, comprising: a backlight frame, first and second LED light sources that are mounted in the backlight frame and are opposite to each other, first and second diffuser plates that are mounted in the backlight frame and are opposite to each other, first and second mold frames that are mounted on the backlight frame and are opposite to each other, first and second curved liquid crystal display panels that are respectively mounted to the first and second mold frames and are opposite to each other, and a bezel that is mounted to the first and second curved liquid crystal display panels, the first LED light source facing one side of the backlight frame, the second LED light source facing an opposite side of the backlight frame, the backlight frame comprising a backplane brace, a backplane mounted to the backplane brace, and a backplane mounting strip mounted to the side of the backplane that is away from the backplane brace, the first and second diffuser plates being planar, the first and second curved liquid crystal display panels being curved in the same direction or in different directions.

2. The double-sided curved liquid crystal display device as claimed in claim 1, wherein the backplane and the backplane mounting strip are respectively provided with a plurality of first and second through holes that correspond to each other and the backplane brace is provided with a plurality of the threaded holes corresponding to the plurality of first and second through holes, a bolt being set through the first and second through holes to engage each of the threaded holes so as to couple the backplane brace, the backplane, and the backplane mounting strip to each other.

3. The double-sided curved liquid crystal display device as claimed in claim 2, wherein the backplane mounting strip comprises a first mounting groove formed in a middle portion thereof and the first LED light source is received and retained in the first mounting groove; and the backplane brace comprises a second mounting groove formed in a middle portion thereof and the second LED light is received and retained in the second mounting groove.

4. The double-sided curved liquid crystal display device as claimed in claim 3, wherein the first LED light source is retained in the first mounting groove through interference fitting and the second LED light source is retained in the second mounting groove through interference fitting.

5. The double-sided curved liquid crystal display device as claimed in claim 1, wherein the bezel comprises a side plate and first and second surface plates respectively connected to opposite ends of the side plate, the first and second mold frames being mounted to the backplane brace and adjacent to the side plate, the first mold frame comprising a first curved surface, the first curved surface being curved so as to be of a curving direction and curvature that are the same as those of the first curved liquid crystal display panel, whereby the first curved liquid crystal display panel is positioned against the first curved surface; the second mold frame comprises a second curved surface, the second curved surface being curved so as to be of a curving direction and curvature that are the same as those of the second curved liquid crystal display panel, whereby the second curved liquid crystal display panel is positioned against the second curved surface; the first surface plate of the bezel comprises a third curved surface, the third curved surface being curved so as to be of a curving direction and curvature that are the same as those of the first curved liquid crystal display panel, whereby the third curved surface is positioned tightly against the first curved liquid crystal display panel; the second surface plate comprises a fourth curved surface, the fourth curved surface being curved so as to be of a curving direction and curvature that are the same as those of the second curved liquid crystal display panel, whereby the fourth curved surface is positioned tightly against the second curved liquid crystal display panel.

6. The double-sided curved liquid crystal display device as claimed in claim 5 further comprising a first cushion member arranged between the first curved surface and the first liquid crystal display panel and coupled through adhesive bonding to the first curved surface and a second cushion member arranged between the second curved surface and the second liquid crystal display panel and coupled through adhesive bonding to the second curved surface.

7. The double-sided curved liquid crystal display device as claimed in claim 5 further comprising a third cushion member arranged between the third curved surface and the first liquid crystal display panel and coupled through adhesive bonding to the third curved surface and a fourth cushion member arranged between the fourth curved surface and the second liquid crystal display panel and coupled through adhesive bonding to the fourth curved surface.

8. The double-sided curved liquid crystal display device as claimed in claim 1, wherein the backplane brace has an end that is provided with first and second projection blocks at sides thereof respectively adjacent to the first and second mold frames, the first and second mold frames being respectively provided with first and second recesses corresponding to the first and second projection blocks, the first and second projection blocks being respectively fit into and retained in the first and second recesses so as to couple the backplane brace to the first and second mold frames.

9. The double-sided curved liquid crystal display device as claimed in claim 1, wherein the backplane brace comprises first and second support surfaces that are arranged to be opposite to each other, the first and second support surfaces being both flat planar surfaces and both protruding with respect to the middle portion of the backplane brace, the first and second diffuser plates being respectively supported on the first and second support surfaces, a first bearing member being arranged between the first mold frame and the first diffuser plate and coupled through adhesive bonding to the first mold frame and tightly pressing down and holding the first diffuser plate; a second bearing member being arranged between the second mold frame and the second diffuser plate and coupled through adhesive bonding to the second mold frame and tightly pressing down and holding the second diffuser plate.

10. The double-sided curved liquid crystal display device as claimed in claim 1, wherein the double-sided curved liquid crystal display device further comprises first and second reflector plates that are mounted to the backlight frame to respectively correspond to the first and second diffuser plates.

11. A double-sided curved liquid crystal display device, comprising: a backlight frame, first and second LED light sources that are mounted in the backlight frame and are opposite to each other, first and second diffuser plates that are mounted in the backlight frame and are opposite to each other, first and second mold frames that are mounted on the backlight frame and are opposite to each other, first and second curved liquid crystal display panels that are respectively mounted to the first and second mold frames and are opposite to each other, and a bezel that is mounted to the first and second curved liquid crystal display panels, the first LED light source facing one side of the backlight frame, the second LED light source facing an opposite side of the backlight frame, the backlight frame comprising a backplane brace, a backplane mounted to the backplane brace, and a backplane mounting strip mounted to the side of the backplane that is away from the backplane brace, the first and second diffuser plates being planar, the first and second curved liquid crystal display panels being curved in the same direction or in different directions;

wherein the backplane and the backplane mounting strip are respectively provided with a plurality of first and second through holes that correspond to each other and the backplane brace is provided with a plurality of the threaded holes corresponding to the plurality of first and second through holes, a bolt being set through the first and second through holes to engage each of the threaded holes so as to couple the backplane brace, the backplane, and the backplane mounting strip to each other;

wherein the backplane mounting strip comprises a first mounting groove formed in a middle portion thereof and the first LED light source is received and retained in the first mounting groove; and the backplane brace comprises a second mounting groove formed in a middle portion thereof and the second LED light is received and retained in the second mounting groove;

wherein the first LED light source is retained in the first mounting groove through interference fitting and the second LED light source is retained in the second mounting groove through interference fitting;

wherein the bezel comprises a side plate and first and second surface plates respectively connected to opposite ends of the side plate, the first and second mold frames being mounted to the backplane brace and adjacent to the side plate, the first mold frame comprising a first curved surface, the first curved surface being curved so as to be of a curving direction and curvature that are the same as those of the first curved liquid crystal display panel, whereby the first curved liquid crystal display panel is positioned against the first curved surface; the second mold frame comprises a second curved surface, the second curved surface being curved so as to be of a curving direction and curvature that are the same as those of the second curved liquid crystal display panel, whereby the second curved liquid crystal display panel is positioned against the second curved surface; the first surface plate of the bezel comprises a third curved surface, the third curved surface being curved so as to be of a curving direction and curvature that are the same as those of the first curved liquid crystal display panel, whereby the third curved surface is positioned tightly against the first curved liquid crystal display panel; the second surface plate comprises a fourth curved surface, the fourth curved surface being curved so as to be of a curving direction and curvature that are the same as those of the second curved liquid crystal display panel, whereby the fourth curved surface is positioned tightly against the second curved liquid crystal display panel; and further comprising a first cushion member arranged between the first curved surface and the first liquid crystal display panel and coupled through adhesive bonding to the first curved surface and a second cushion member arranged between the second curved surface and the second liquid crystal display panel and coupled through adhesive bonding to the second curved surface.

12. The double-sided curved liquid crystal display device as claimed in claim 11 further comprising a third cushion member arranged between the third curved surface and the first liquid crystal display panel and coupled through adhesive bonding to the third curved surface and a fourth cushion member arranged between the fourth curved surface and the second liquid crystal display panel and coupled through adhesive bonding to the fourth curved surface.

13. The double-sided curved liquid crystal display device as claimed in claim 11, wherein the backplane brace has an end that is provided with first and second projection blocks at sides thereof respectively adjacent to the first and second mold frames, the first and second mold frames being respectively provided with first and second recesses corresponding to the first and second projection blocks, the first and second projection blocks being respectively fit into and retained in the first and second recesses so as to couple the backplane brace to the first and second mold frames.

14. The double-sided curved liquid crystal display device as claimed in claim 11, wherein the backplane brace comprises first and second support surfaces that are arranged to be opposite to each other, the first and second support surfaces being both flat planar surfaces and both protruding with respect to the middle portion of the backplane brace, the first and second diffuser plates being respectively supported on the first and second support surfaces, a first bearing member being arranged between the first mold frame and the first diffuser plate and coupled through adhesive bonding to the first mold frame and tightly pressing down and holding the first diffuser plate; a second bearing member being arranged between the second mold frame and the second diffuser plate and coupled through adhesive bonding to the second mold frame and tightly pressing down and holding the second diffuser plate.

15. The double-sided curved liquid crystal display device as claimed in claim 11, wherein the double-sided curved liquid crystal display device further comprises first and second reflector plates that are mounted to the backlight frame to respectively correspond to the first and second diffuser plates.

* * * * *